(12) United States Patent
Dutta et al.

(10) Patent No.: US 10,805,463 B2
(45) Date of Patent: Oct. 13, 2020

(54) METHOD AND APPARATUS FOR PROVIDING MULTIMODAL INTERACTION ASSISTANCE TO CALLERS

(71) Applicant: [24]7.ai, Inc., San Jose, CA (US)

(72) Inventors: Kavita Rai Dutta, Bangalore (IN);
Nitin Kumar Singh, Bangalore (IN);
Rajagopala Udupa, Bengaluru (IN)

(73) Assignee: [24]7.ai, Inc., San Jose, CA (US)

( * ) Notice: Subject to any disclaimer, the term of this patent is extended or adjusted under 35 U.S.C. 154(b) by 0 days.

(21) Appl. No.: 16/700,850

(22) Filed: Dec. 2, 2019

(65) Prior Publication Data

US 2020/0177730 A1    Jun. 4, 2020

(30) Foreign Application Priority Data

Dec. 3, 2018    (IN) .............................. 201841045645

(51) Int. Cl.
*H04M 3/51*    (2006.01)
(52) U.S. Cl.
CPC ....... *H04M 3/5141* (2013.01); *H04M 3/5166* (2013.01); *H04M 3/5191* (2013.01)
(58) Field of Classification Search
CPC . H04M 3/5141; H04M 3/5166; H04M 3/5191
USPC .................. 379/265.09, 265.01, 266.01, 309
See application file for complete search history.

(56) References Cited

U.S. PATENT DOCUMENTS

| | | | |
|---|---|---|---|
| 2008/0295022 A1* | 11/2008 | Valdes | G06F 16/972 715/781 |
| 2018/0007102 A1 | 1/2018 | Klein et al. | |
| 2018/0077287 A1 | 3/2018 | Nguyen et al. | |
| 2018/0084111 A1 | 3/2018 | Pirat et al. | |
| 2018/0115643 A1* | 4/2018 | Skiba | H04L 51/02 |

\* cited by examiner

*Primary Examiner* — Quynh H Nguyen
(74) *Attorney, Agent, or Firm* — Perkins Coie LLP; Michael Glenn (57) ABSTRACT

A method and apparatus for providing multimodal interaction assistance to customers seeking assistance from agents of an enterprise is disclosed. The method includes augmenting an ongoing voice interaction between a caller and an automated agent with a speech synchronized web session. A session identifier and contextual information in relation to the speech synchronized web session are stored in a database. A display of an option to interact with a human agent is caused during the ongoing speech synchronized web session. In response to a selection of the option by the caller, a co-browsing of the speech synchronized web session by the caller and the human agent is facilitated. The co-browsing of the speech synchronized web session and the contextual information stored in relation to the speech synchronized web session enable the human agent to provide assistance to the caller.

20 Claims, 7 Drawing Sheets

METHOD AND APPARATUS FOR PROVIDING MULTIMODAL INTERACTION ASSISTANCE TO CALLERS

CROSS REFERENCE TO RELATED APPLICATIONS

This application claims priority to Indian provisional patent application No. 201841045645, filed Dec. 3, 2018, which is incorporated herein in its entirety by this reference thereto.

TECHNICAL FIELD

The present technology generally relates to interactions between enterprises and customers of the enterprises and, more particularly to, a method and apparatus for providing multimodal interaction assistance to customers seeking assistance from agents of an enterprise.

BACKGROUND

Enterprises may engage with existing and potential customers to draw the customer's attention towards a product or a service, to provide information about an event of customer interest, to offer incentives and discounts, to solicit feedback, to provide billing related information etc.

Similarly, the customers may initiate interactions with the enterprises to enquire about products/services of interest, to resolve concerns, to make payments, to lodge complaints etc. The interactions between the customers and the enterprises may be conducted over a plurality of interaction channels, such as a Web channel, a voice channel, a chat channel, an interactive voice response (IVR) channel, a social media channel, a native mobile application channel, and the like.

In many example scenarios, the interactions between the enterprises and the customers may be conducted simultaneously over multiple interaction channels and may involve multiple devices. In an illustrative example, a customer of an enterprise may need assistance in completing a payment transaction on the enterprise website. The customer may call a customer support center and get connected with an Interactive Voice Response (IVR) system. The calling customer is hereinafter referred to as a 'caller'. The IVR logic may provide a self-serve link to the customer on a device different than the device used for interacting with the IVR system. The self-serve link, when selected by the customer will enable the customer in completing the payment transaction. In such a case, the interaction between the enterprise and the customer is continued simultaneously on the call (with the IVR) as well as on the enterprise website. As multiple interaction channels (for example, speech interaction channel and Web interaction channel) and one or more caller devices are involved during the course of a single interaction, such an interaction is referred to as a multimodal interaction.

In many example scenarios, the caller may face an issue during the course of a self-serve multimodal interaction and may require the assistance of a human agent to help resolve the issue. In such a case, the caller may have to end the Web session or request the IVR to forward the call to a human agent. The human agent, once connected, may not be able to view the caller activity on the linked Web session and as such, the interaction may turn increasingly disjointed.

In many cases, the agent and the caller may have to interact multiple times to provide the desired assistance to the caller. The disjointed communication on multiple interaction channels may ruin a quality of interaction experience afforded to the caller. In some cases, the caller may choose to not pursue the interaction with the agent, leading to a loss of a customer and a potential loss of business for the enterprise.

There is a need to provide multimodal interaction assistance to callers while precluding to-and-fro or disjointed communication over multiple interaction channels between the callers and the agents.

SUMMARY

In an embodiment of the invention, a computer-implemented method for providing multimodal interaction assistance to callers seeking assistance from agents of an enterprise is disclosed. The method augments, by a processor, an ongoing voice interaction between a caller and an automated agent with a speech synchronized web session. The voice interaction is augmented with the speech synchronized web session in response to a request received from the automated agent. The method stores in a database by the processor, a session identifier and contextual information in relation to the speech synchronized web session. A context of the caller's voice interaction with the automated agent and the caller's activity on the speech synchronized web session is captured in an ongoing manner to configure the contextual information. The method causes, by the processor, display of an option to interact with a human agent during the ongoing speech synchronized web session. In response to a selection of the option by the caller, the method facilitates by the processor, a co-browsing of the speech synchronized web session by the caller and the human agent. The co-browsing of the speech synchronized web session and the contextual information stored in relation to the speech synchronized web session enable the human agent to provide assistance to the caller.

In an embodiment of the invention, an apparatus for providing multimodal interaction assistance to callers seeking assistance from agents of an enterprise is disclosed. The apparatus includes a processor and a memory. The memory stores instructions. The processor is configured to execute the instructions and thereby cause the apparatus to augment an ongoing voice interaction between a caller and an automated agent with a speech synchronized web session. The voice interaction is augmented with the speech synchronized web session in response to a request received from the automated agent. The apparatus stores in a database a session identifier and contextual information in relation to the speech synchronized web session. A context of the caller's voice interaction with the automated agent and the caller's ongoing activity on the speech synchronized web session is captured in an ongoing manner to configure the contextual information. The apparatus causes display of an option to interact with a human agent during the ongoing speech synchronized web session. In response to a selection of the option by the caller, the apparatus facilitates a co-browsing of the speech synchronized web session by the caller and the human agent. The co-browsing of the speech synchronized web session and the contextual information stored in relation to the speech synchronized web session enable the human agent to provide assistance to the caller.

In an embodiment of the invention, another computer-implemented method for providing multimodal interaction assistance to chat customers seeking assistance from agents of an enterprise is disclosed. The method augments, by a processor, an ongoing chat interaction between a customer and an automated chat agent with a speech synchronized web session. The chat interaction is augmented with the speech synchronized web session in response to a request received from the automated chat agent. The method causes, by the processor, display of an option to interact with a human agent during the ongoing speech synchronized web session. In response to a selection of the option by the customer, the method identifies by the processor, one or more content pieces relevant to the customer based on a contextual information stored in relation to the speech synchronized web session. The one or more content pieces are displayed to the human agent. The method facilitates, by the processor, a co-browsing of the speech synchronized web session by the customer and the human agent. At least one content piece is selected from among the one or more content pieces by the human agent and displayed to the customer during the co-browsing of the speech synchronized web session to provide assistance to the customer.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Various embodiments of the present invention provide a method and an apparatus for providing multimodal interaction assistance to customers calling to seek assistance from customer support representatives or agents of an enterprise. A calling customer or a customer, who has placed a voice call to a customer support/service center is hereinafter referred to as a 'caller'.

In one embodiment, the apparatus is configured to receive a phone call from a caller wishing to speak to a customer support representative. The apparatus is configured to receive the call and connect the call to an automated agent, such as an Interactive Voice Response (IVR) system, deployed at the customer support/service center. In some embodiments, based on the initial interaction of the caller with the IVR, the IVR logic may determine that the caller may be better served by a self-serve Web-based option. In such a scenario, the apparatus facilitates augmentation of the ongoing voice interaction between the caller and the IVR with a linked Web session to enable the caller to receive the desired assistance in a simpler and faster way. In one embodiment, the apparatus may provide a message including a Uniform Resource (URL) to the caller. In one illustrative example, a text message embodied as a Short Message Service (SMS) may be provided on a device (for example, a smartphone) used by the caller to contact the customer support/service center. In one illustrative example, the text message embodied as an Email may be sent to a different caller device (i.e. a device different than a device used by the caller to contact the customer support/service center), which is accessible to the caller. The caller may select the URL in the text message to trigger a linked web session.

In one embodiment, the caller may be diverted using a device browser to a webpage UI subsequent to a selection of the URL in the text message. The webpage UI may be a part of several UIs created to seek input from the caller in order to provide the desired assistance to the caller. The caller may provide inputs through the visual elements displayed on the UI or by providing spoken utterances or by typing text to provide input in various fields displayed on the webpage UIs. It is noted that the visual and voice communication are synchronized to provide an ease of providing input to the caller. More specifically, the caller can continue to speak answers corresponding to the various form fields and the form fields may get automatically populated with the spoken answers, thereby precluding the need for the caller to type the answers in the form fields. Such a web session is also referred to herein as a 'speech synchronized web session'.

It is noted that a call flow (i.e. a spoken form of communication) is maintained from the IVR to the speech synchronized web session to navigate the user across the multi modal journey, which may include filling out of form fields on webpage UIs. It is further noted that the voice interaction between the caller and the IVR may be continued or discontinued during the caller activity on the webpage UIs during the ongoing speech synchronized web session. As such, the caller is extended assistance on multiple interaction channels (for example, speech and web interaction channels) on same or multiple devices, thereby in effect, the caller is extended multimodal interaction assistance.

In some example scenarios, the caller may face difficulty in completing the self-serve options presented on the webpage UIs. In such a case, an option to interact with a human agent is provided to the caller by the apparatus. In at least one embodiment, a selection of the option to speak with the human agent is configured to cause display of a UI showing an estimated waiting time for speaking with the human agent. In some embodiments, the caller is provided with a call-back option configured to arrange a call-back from the human agent once the human agent is available, should the caller decide not to wait for the human agent.

In at least one example embodiment, a context of the interaction (i.e. journey of the caller's voice interaction with the IVR and subsequent inputs on the webpage UIs) is provided to a human agent assigned to interact with the caller. On connecting with human agent, a screen-sharing session is automatically triggered, Where the human agent and the caller can both view and browse, i.e. co-browse content being displayed on the caller's (or agent's) screen.

In at least some embodiments, the apparatus is configured to identify/select one or more content pieces i.e. webpage based content) that can be shared with the caller during the speech synchronized web session based on the context of the interaction so far. The apparatus may provide the human agent with several content piece options for the current interaction with the caller. The human agent may select a content piece capable of resolving the caller's issue and push the content piece during the screen-sharing session. The human agent may thereafter assist the caller in resolving the issue or may direct the caller appropriately to self-resolve the issue. Such a multimodal interaction assistance provided to the callers improves a quality of interaction experience for the callers and also contributes to an increase in sale of goods and services offered for sale by the enterprise. It is noted that the multimodal interaction assistance may be provided to the caller on any electronic device (such as a desktop computer for example) apart from the caller's mobile phone (used for interacting with IVR) or using any other mode if the user is present on other device/mode when the caller is also available on the mobile phone.

Figure 1:
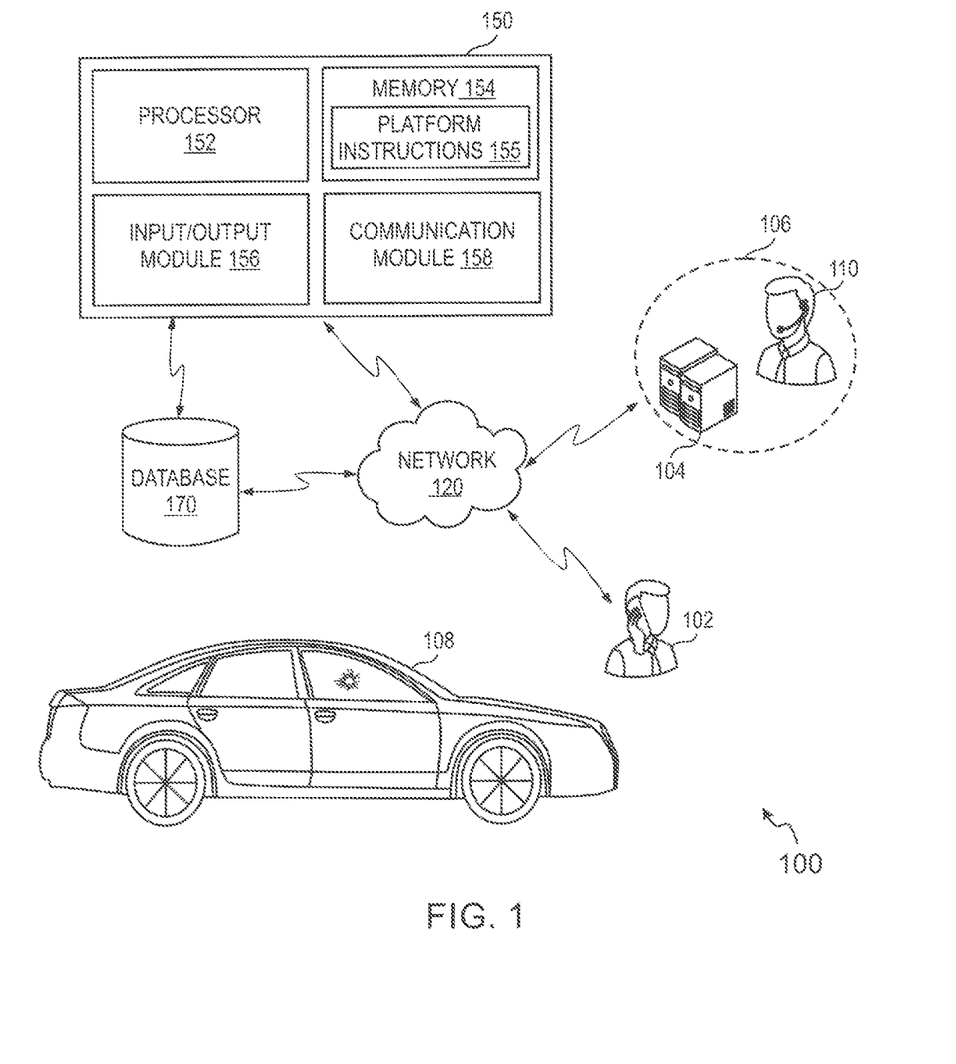
FIG. 1 is a representation showing an apparatus configured to provide multimodal interaction assistance to customers calling to speak with agents of an enterprise, in accordance with an embodiment of the invention.

FIG. 1 is a representation 100 showing an apparatus 150 configured to provide multimodal interaction assistance to customers calling to speak with agents of an enterprise, in accordance with an embodiment of the invention.

The representation 100 shows a showing a calling customer 102 engaged in a voice interaction with an Interactive Voice Response (IVR) system 104 associated with an enterprise. The calling customer 102 is hereinafter referred to as a caller 102. The caller 102 may be an existing or a potential user of products, service or information offered by the enterprise (not shown in FIG. 1). The term 'enterprise' as used throughout the description may refer to a corporation, an institution or even a small/medium sized company offering products, services or information to customers. For example, the enterprise may be a banking enterprise, an educational institution, a financial trading enterprise, an aviation company, a consumer goods enterprise, an insurance company, a telecommunication enterprise or any such public or private sector enterprise.

The enterprise may offer customer service/customer support in form of a plurality of human agents and automated agents, who are trained to engage in interactions with the customers of the enterprise to resolve the customer queries and, in general, provide any desired assistance to the customers. It is noted that for purposes of the description, the terms 'customer service center', and 'customer support center' imply a facility, in which a plurality of human agents, a plurality of automated agents and several self-serve systems are deployed for providing assistance to the customers. Such a facility is hereinafter referred to as a customer support center. An example customer support center is depicted in the representation 100 as a customer support center 106. The customer support center 106 is exemplarily depicted to include only one IVR system in form of the IVR system 104 and one human voice agent 110 for illustration purposes. It is noted the customer support center 106 may include a plurality of IVR systems, a plurality of human agents, a plurality of automated/virtual agents such as chatbots, and a plurality of self-serve systems.

In an illustrative example, the caller 102 may need assistance in tiling an insurance claim for a broken windshield of a caller's car 108. The caller 102 may place a call to the customer support center 106 associated with the enterprise to seek assistance on filing of the insurance claim. The enterprise in such a case corresponds to an insurance company with whom the car 108 is insured.

In at least one example embodiment, the voice call placed by the caller 102 may be received by the apparatus 150 on account of the apparatus 150 being in operative communication with the customer support center 106. More specifically, the apparatus 150 may in operative communication with server(s), one or more systems such as IVR systems, and agent devices deployed at the customer support center 106. The communication between the apparatus 150 and the deployments at the customer support center 106 may be conducted over a communication network, such as a network 120. The network 120 may be embodied as a wired communication network (for example, Ethernet, local area network (LAN), etc.), a wireless communication network (for example, a cellular network, a wireless LAN, etc.) or a combination of wired communication networks and wireless communication networks (for example, the Internet).

In one embodiment, the apparatus 150 is embodied as an interaction platform with one or more components of the apparatus 150 implemented as a set of software layers on top of hardware systems. In an illustrative example, the interaction platform may communicate over the network 120 with a Web server deployed at the customer support center 106 to receive information related to agent-caller interactions in an ongoing manner in substantially real-time. In another illustrative example, the interaction platform may be in operative communication with servers associated with enterprise interaction channels, such as a server hosting an enterprise website to receive information related to customer activity on the website in substantially real-time.

The apparatus 150 includes at least one processor, such as a processor 152 and a memory 154. It is noted that although the apparatus 150 is depicted to include only one processor, the apparatus 150 may include more number of processors therein. In one embodiment, the memory 154 is capable of storing machine executable instructions, referred to herein as platform instructions 155. Further, the processor 152 is capable of executing the platform instructions 155. In an embodiment, the processor 152 may be embodied as a multi-core processor, a single core processor, or a combination of one or more multi-core processors and one or more single core processors. For example, the processor 152 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 152 may be configured to execute hard-coded functionality. In an embodiment, the processor 152 is embodied as an executor of software instructions, wherein the instructions may specifically configure the processor 152 to perform the algorithms and/or operations described herein when the instructions are executed.

The memory 154 may be embodied as one or more volatile memory devices, one or more non-volatile memory devices, and/or a combination of one or more volatile memory devices and non-volatile memory devices. For example, the memory 154 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

The apparatus 150 is further depicted to be operably associated with a database 170 configured to store information related to each interaction between callers and agents of an enterprise. It is noted that the interactions may include multimodal interactions, i.e. the interactions may involve multiple interaction channels and multiple caller devices. Such stored interaction information serves to facilitate a passing of context during multimodal interactions as will be explained in detail later.

The database 170 may include multiple storage units such as hard disks and/or solid-state disks in a redundant array of inexpensive disks (RAID) configuration. In FIG. 1, the database 170 is depicted to be external to the apparatus 150. In such a scenario, the database 170 may be embodied as a storage area network (SAN) and/or a network attached storage (NAS) system. Further, the database 170 may be accessed by the apparatus 150 using a storage interface (not shown in FIG. 1). The storage interface is any component capable of providing the processor 152 with access to the database 170. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 152 with access to the database 170. In some embodiments, the database 170 may be included within the apparatus 150. For example, the apparatus 150 may include one or more hard disk drives as the database 170.

The apparatus 150 also includes an input/output module 156 (hereinafter referred to as an 'I/O module 156') and at least one communication module such as a communication module 158. The I/O module 156 includes mechanisms configured to receive inputs from and provide outputs to the user of the apparatus 150. The term 'user of the apparatus 150' as used herein refers to any individual or groups of individuals assigned with operating the apparatus 150 for providing multimodal interaction assistance to customers (for example, calling customers) of the enterprise. In an illustrative example, an enterprise may employ several data scientists, Machine Learning (ML) and/or Artificial Intelligence (AI) analysts, Information Technology (IT) professionals, scientists and researchers for configuring and operating the apparatus 150 embodied as an interaction platform. In an illustrative example, the I/O module 156 may enable the user of the apparatus 150 to configure scripts to manage multimodal interactions across devices and interaction channels. In another illustrative example, the I/O module 156 may enable the user of the apparatus 150 to feed/input information related to agents, such as agent domain specialization for instance, to enable routing of interaction requests from callers to appropriate agents deployed at the customer support center 106. To provide such inputs and view corresponding outputs, the I/O module 156 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 152 may include I/O circuitry configured to control at least some functions of one or more elements of the I/O module 156, such as, for example, a speaker, a microphone, a display, and/or the like. The processor 152 and/or the I/O circuitry may be configured to control one or more functions of the one or more elements of the I/O module 156 through computer program instructions, for example, software and/or firmware, stored on a memory, for example, the memory 154, and/or the like, accessible to the processor 152.

The communication module 158 is configured to facilitate communication between the apparatus 150 and one or more remote entities over a communication network, such as the network 120. For example, the communication module 158 may enable communication between the apparatus 150 and agent devices and/or IVR systems deployed at the customer support center 106. In an illustrative example, the communication module 158 receives information related to interactions between callers and agents being conducted using various interaction channels, in real-time and provides the information to the processor 152.

In an embodiment, various components of the apparatus 150, such as the processor 152, the memory 154, the I/O module 156 and the communication module 158 are configured to communicate with each other via or through a centralized circuit system (not shown in FIG. 1). The centralized circuit system may be various devices configured to, among other things, provide or enable communication between the components (152-158) of the apparatus 150. In certain embodiments, the centralized circuit system may be a central printed circuit board (PCB) such as a motherboard, a main board, a system board, or a logic board. The centralized circuit system may also, or alternatively, include other printed circuit assemblies (PCAs) or communication channel media.

It is noted that the apparatus 150 as illustrated and hereinafter described is merely illustrative of an apparatus that could benefit from embodiments of the invention and, therefore, should not be taken to limit the scope of the invention. It is noted that the apparatus 150 may include fewer or more components than those depicted in FIG. 1. In an embodiment, one or more components of the apparatus 150 may be deployed in a Web Server. In another embodiment, the apparatus 150 may be a standalone component in a remote machine connected to a communication network and capable of executing a set of instructions (sequential and/or otherwise) to provide multimodal interaction assistance to customers. Moreover, the apparatus 150 may be implemented as a centralized system, or, alternatively, the various components of the apparatus 150 may be deployed in a distributed manner while being operatively coupled to each other. In an embodiment, one or more functionalities of the apparatus 150 may also be embodied as a client within devices, such as online visitor's devices. In another embodiment, the apparatus 150 may be a central system that is shared by or accessible to each of such devices.

In one embodiment, the processor 152 of the apparatus 150, on account of being in operative communication with the customer support center 106, may receive a call from the caller 102 wishing to speak with a customer support representative of the enterprise. The processor 152 may be configured to connect the caller 102 to an automated agent deployed at the customer support center 106. It is noted that the automated agent is trained to communicate with callers, such as the caller 102, and provide the callers with desired assistance. In one embodiment, the automated agent may be embodied as an automated voice agent in the form of an Interactive Voice Response (IVR) system, such as the IVR system 104 deployed at the customer support center 106. The IVR system 104 may further be trained to either assist the caller by itself, route the call to a human agent or direct the caller to a self-serve option.

In one illustrative example, the logic associated with the IVR system 104 may determine that the caller 102 is better served using a self-serve option instead of the ongoing voice interaction. For example, in the case of filing of an insurance claim for the car 108, several inputs, such as a car registration number, an insurance policy number, claimed value of damaged part, etc., needs to be provided by the claimant. In such a situation, the IVR logic may determine that it would be better for the caller 102 to input such details as text in form fields as opposed to selecting options and providing keyboard inputs on a phone pad. Accordingly, in one embodiment, the IVR system 104 may provide a request to the processor 152 to add a self-serve interaction channel to the ongoing voice interaction.

In one embodiment, in response to receiving the request from the IVR system 104, the processor 152 may be configured to predict one or more devices accessible to the caller 102, where each device is connected to, or capable of, accessing a communication network, such as the network 120. It is noted that an electronic device used by the caller 102 for conducting the ongoing voice interaction with the IVR system 104 may also be accounted for in the prediction of the one or more devices accessible to the caller 102. In one embodiment, the processor 152 may predict one or more devices accessible to the caller 102 based on previous interactions that the caller 102 had with the customer support center 106. In one embodiment, to predict one or more devices accessible to the caller 102, the processor 152 may check for current presence of the caller 102 in other interaction channels, such as social media channel, chat channel, etc. using other devices. Alternatively, the IP address or location information of other devices may be identified from servers logging customer activity information and matched with the caller's current location to determine the devices accessible to the caller 102. In some embodiments, the IVR system 104 may check with the caller 102 on the devices that the caller 102 can access at the moment and avoid prediction of devices accessible to the caller 102.

If the caller 102 can access any of the connected devices, such as a smart phone, iPad, laptop, PDA, or any other suitable device, then the IVR system 104 may inform the caller 102 that a simple and fast self-serve option in form of a speech synchronized web session is available for tiling of the insurance claim. The IVR system 104 may further seek the permission of the caller 102 to augment the call with the speech synchronized web session.

It is noted that, in some embodiments, the voice call placed by the caller 102 may be connected to the human voice agent 110. The human voice agent 110, on learning the caller's issue, may also offer the self-serve option in form of a speech synchronized web session to the caller 102 and seek the caller's permission to the augment the call with the speech synchronized web session.

If the caller 102 agrees to the request to augment the voice interaction with the speech synchronized web session, then the apparatus 150 on account of tracking the interaction may be configured to receive the caller's confirmation to augment the voice interaction. In response, the processor 152 of the apparatus 150 is configured to transmit a message (for example, a Short Message Service (SMS) or an Email) including a Uniform Resource Locator (URL) to the caller 102 on at least one device from among the devices identified to be accessible to the caller 102. An example text message embodied as a SMS provided to the caller 102 is shown in FIG. 2.

Figure 2:
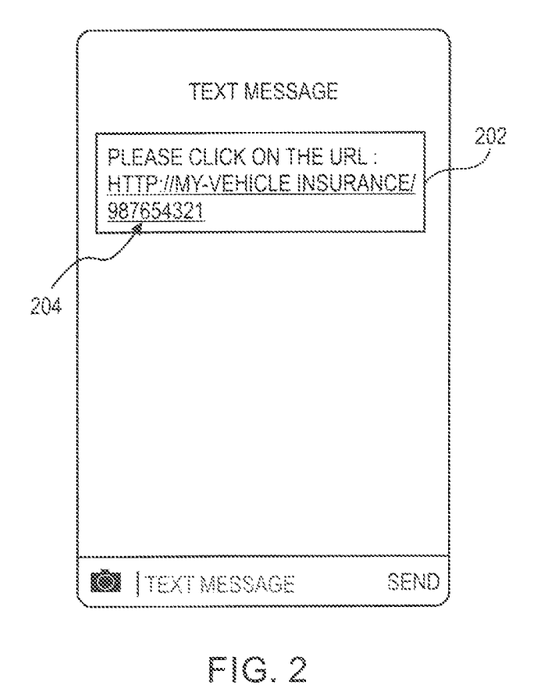
FIG. 2 shows an example text message displayed to a caller on a caller's device, in accordance with an embodiment of the invention.

FIG. 2 shows an example text message 202 displayed to the caller 102 (shown in FIG. 1) on a caller's device (not shown in FIG. 1), in accordance with an embodiment of the invention. As explained with reference to FIG. 1, the caller 102 may have placed a voice call to the customer support center 106 to seek assistance in filing of an insurance claim for a broken windshield of the car 108.

The voice call is connected to the IVR system 104, or as explained with reference to FIG. 1, may be connected to a human agent. The IVR system 104 (or the human agent) may offer a simple and fast self-serve option in form of a speech synchronized web session for filing of the insurance claim to the caller 102 and seek the caller's permission in augmenting the voice interaction between the caller 102 and the IVR system 104 with the speech synchronized web session. The text message 202 may be provided to the caller 102 by the apparatus 150 subsequent to a receipt of the caller's confirmation to augment the voice interaction with the speech synchronized web session.

As an example, the text message 202 is depicted to include the text 'PLEASE CLICK ON THE URL: HTTP:// MY-VEHICLE INSURANCE/987654321' to start the web session. The caller 102 may provide a click input or a touch input on an URL 204 in the text message 202 to trigger augmentation of the voice interaction (i.e. the voice call) with the speech synchronized web session.

The term 'speech synchronized web session' as used throughout the description implies an interaction session between a caller and a series of webpage UIs, where each webpage UI includes one or more form fields requesting caller input and, where the caller navigates through the series of webpage UIs as well as provides the input for the respective form fields using speech or typed text. More specifically, the visual medium of the webpage UIs is synced to the caller speech, such that the caller utterance is configured to be appropriately mapped to the content on the webpage UI. For example, if the caller utters 'NEXT', then the webpage UT may automatically navigate to the next webpage UI. In another illustrative example, if the caller in response to a form field requesting the date of the incident, utters 'YESTERDAY', then the form field may automatically be populated with yesterday's date. It is noted that the caller may also choose to type the date or click on 'NEXT' on the webpage UI. For purposes of description, the speech synchronized web session is hereinafter referred to as 'web session'.

As explained above, one or more webpages (i.e. webpage UIs) are displayed to a caller, such as the caller 102, during the web session and each webpage includes at least one form field capable of receiving textual input transcribed from spoken utterances provided by the caller 102 in response to the respective form field. In one embodiment, the synchronization between the spoken utterances and the caller's activity on the webpages is achieved using one or more Extensible Markup Language (XML) interpreter based on State Chart XML (SCXML) and Call Control XML (CCXML), The augmentation of the IVR call with the web session and the linking of the IVR interaction and web session interaction is explained in detail hereinafter.

In at least one example embodiment, the apparatus 150 uses an SCXML interpreter that is represented in JavaScript (JS), and executes the JS based interpreter in the context of a CCXML application and interpreter. In this way, caller interaction and coordination of dialogs across a browser can be performed in SCXML, which is best suited for this purpose; while the call control and signaling to the voice browser over session initiation protocol (SIP) INFO can be performed by CCXML, which is what CCXML is best suited for. By combining two XML-based languages that would normally have an XML-based interpreter into one context one can author the application as if it was getting a real, fully functional XML-based interpreter, but this implementation abstracts the XML-based interpreter and allows one to combine both execution environments into the same interpreter.

In addition, one way to embed the SCXML interpreter into CCXML is to provide a cloud-based platform component that is the same for, and shared between, different applications and different clients. These CCXML pieces and the linking code between SCXML and CCXML thus provide a common multimodal platform component upon which all multimodal applications can be built. The SCXML, however, can be customized as appropriate for each customer's journey and each application.

It is noted that the apparatus 150 starts purely in one mode, i.e. just VXML. The SCXML controller is only added when it is necessary to operate in a multimodal session. At such time as this occurs, the apparatus 150 joins the application session. The URL 204 in the text message 202 that is then sent enables the caller's web browser to access HTML visual content that is synced with the voice content.

For tying events that contain URLs, such as the URL 204, a portion of the web link URL identifies application servers that house stateful sessions. Link routing as disclosed herein provides a mechanism by which those servers can locate each other, such that live sessions can rendezvous. This linkage differs from other lying behavior herein because this embodiment of the invention ties servers with each other, Other ties link between user information spread across live sessions. An example webpage UI associated with the web session is shown in FIG. 3.

Figure 3:
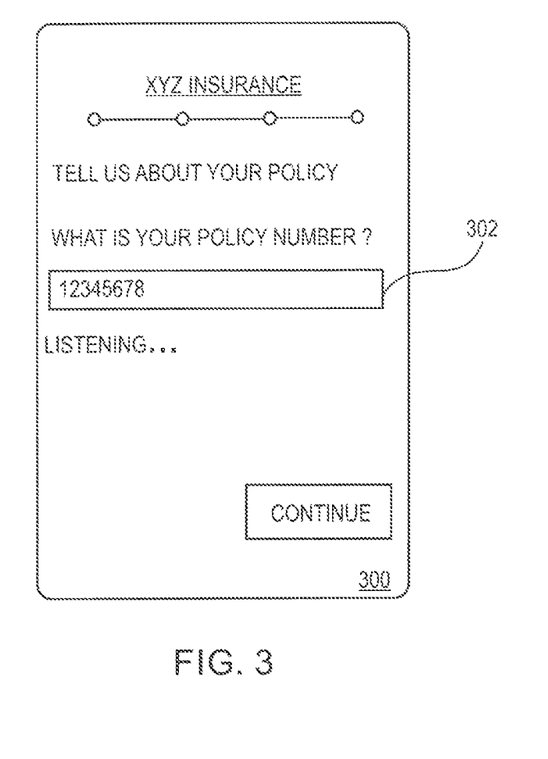
FIG. 3 shows a representation of a webpage UI associated with the speech synchronized web session, in accordance with an embodiment of the invention.

FIG. 3 shows a representation of a webpage UI 300 associated with the web session, in accordance with an embodiment of the invention. The webpage UI 300 is displayed to the caller 102 (shown in FIG. 1) subsequent to the caller's selection of the URL 204 in the text message 202 (shown in FIG. 2).

As an example, the webpage UI 300 is depicted to include a form field 302 requesting the caller 102 to provide an input corresponding the caller's vehicle insurance policy number. It is noted the voice interaction with the IVR system 104 (shown in FIG. 1) may be discontinued subsequent to the augmentation of the voice interaction with the web session. However, in some embodiments, the voice call with the IVR system 104 may simultaneously be maintained during caller interaction with webpage UIs associated with the web session.

In one embodiment, the caller 102 may utter '1-2-3-4-5-6-7-8' to provide an input as 12345678 corresponding to the caller's vehicle insurance policy number. As explained with reference to FIG. 2, the caller's speech input may automatically be converted to text and mapped to the form field 302, such that the form field 302 is populated with the vehicle insurance policy number 12345678 as shown in FIG. 3. The caller 102 may subsequently utter 'CONTINUE' to navigate to the next Web page UI associated with the Web session.

In some embodiments, the web session may involve caller interaction with a plurality of webpage UIs requesting the caller to provide input related to several form fields. For example, for filing of the insurance claim for a broken windshield, the form fields on the webpage UIs may request caller selection of the car type and car make. Further, the caller 102 may be requested to confirm an address and email ID, select a car from among one or more registered cars with the vehicle insurer, provide details of the damage to the car, and the like.

In one embodiment, the caller activity on the web session may be tracked and recorded in the database 170 (shown in FIG. 1). In some embodiments, the caller's interaction, right from the IVR interaction to the current web session may be tracked and recorded. Such recorded information captures a 'context' of the interaction conducted so far and is hereinafter referred to as 'contextual information'. In one embodiment, the contextual information is stored with a session Identifier (ID), which is configured to uniquely identify the caller's interaction with the IVR/web session. The tracking/recording of the contextual information and the subsequent storage of the contextual information with a session ID may be provided as a web service by the apparatus 150. The web service is hereinafter referred to as 'context service'. The context service may be called during multimodal interaction transfers as will be explained later with reference to FIG. 5.

In an embodiment, the insurance claim may be successfully filed once the caller 102 provides an input corresponding to all the form fields displayed on the various webpage UIs associated with the web session. However, in some cases, the caller 102 may face issues while providing input corresponding to the form fields on the various webpage UIs. In an illustrative example, the caller 102 may have insured three cars with the vehicle insurer. However, a webpage UI may display only two of the three cars for caller selection of the car for which the windshield is broken. As such, the caller 102 may need to add a car to the insured cars' list. In some embodiments, the caller 102, in spite of several attempts may not be able to add a car to the insured cars' list. In such a scenario, the apparatus 150 may be configured to cause display of an option to interact with a human agent during the ongoing speech synchronized web session, thereby providing an option to the caller 102 to connect to a human agent and seek assistance from the human agent. The option presented to the caller 102 on the caller's device is shown in FIG. 4.

Figure 4:
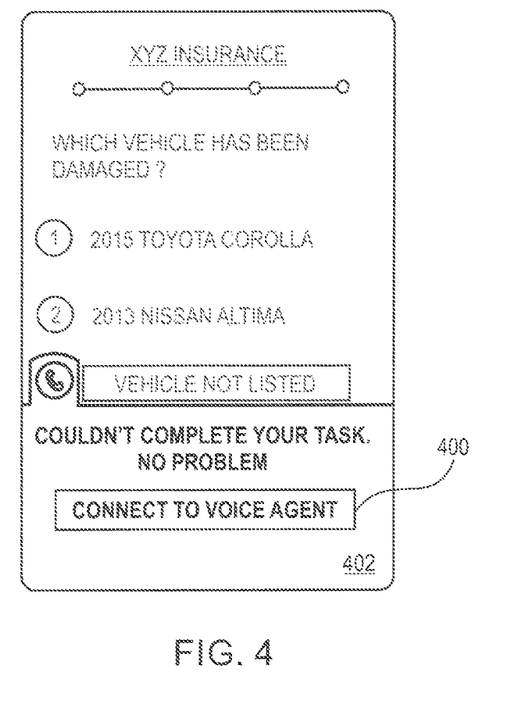
FIG. 4 shows a representation of an example option displayed on a webpage UI associated with a speech synchronized web session interaction of the caller, in accordance with an embodiment of the invention.

FIG. 4 shows a representation of an example option 400 displayed on a webpage UI 402 associated with a speech synchronized web session interaction of the caller 102 (shown in FIG. 1), in accordance with an embodiment of the invention.

As explained with reference to FIG. 3, the caller 102 may face an issue while completing the steps associated with the web session and may need agent assistance. The apparatus 150, on account of tracking of the caller's activity during the ongoing web session may detect the caller's need for assistance. In response to the detection of the caller's need for assistance, the apparatus 150 causes display of an option, such as the option 400, on a display screen of the caller's device. More specifically, the option 400 is displayed on the webpage UI (Le, the webpage UI 402) associated with the web session that the caller 102 is currently interacting with.

As an example, the option 400 is depicted to be embodied as a user-selectable button capable of receiving a caller selection. The option 400 is exemplarily depicted to be associated with text 'CONNECT TO VOICE AGENT'. The caller 102 may utter 'connect to voice agent' or provide a click/touch input on the option 400 to initiate a voice conversation with a human agent. In one embodiment, the apparatus 150 may receive the caller selection of the option 400 and identify a human agent from among a plurality of human agents capable of handling a voice interaction with the caller 102. In some scenarios, the identified human agent may be engaged in interaction with another caller and may be estimated to be free in some time. In such a situation, the apparatus 150 may be configured to display an estimated waiting time to connect to a human agent to the caller 102 and provide the caller 102 with an option to either wait for the human agent to join or arrange for a call-back from the human agent after the stipulated waiting time is over. The caller 102 may choose to wait for the stipulated waiting time or hang up and receive a call from the human agent once the stipulated waiting time is over. An example human agent is shown as the human voice agent 110 in FIG. 1.

In one embodiment, the human agent upon completion of the interaction with another caller may provide an indication to initiate the interaction with the caller 102. The apparatus 150 is configured to call the contextual service using an application programming interface (API) call and provide the contextual information along with the session ID to the human agent. The human agent may learn the entire history of the caller's interaction so far from the contextual information. For example, the human agent may learn that the caller 102 called for filing an insurance claim for a broken windshield of a car, was connected to an IVR system first, the call was augmented with a web session, and then the caller 102 had an issue in adding a car to the insured cars' list while completing all the steps on the webpage UIs associated with the web session. An example contextual information provided to the human agent is shown in FIG. 5.

Figure 5:
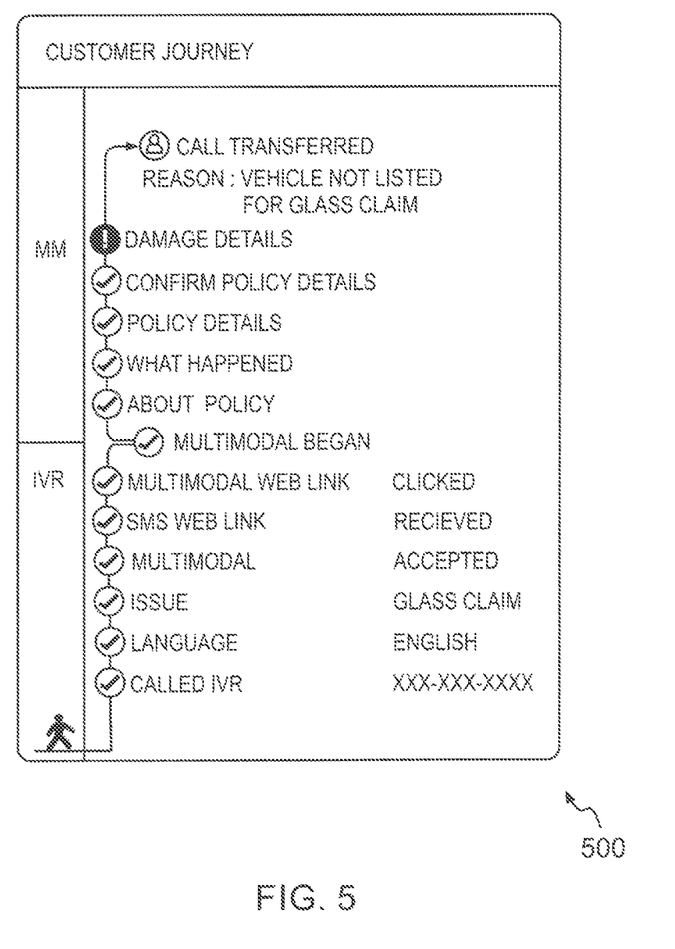
FIG. 5 is an example representation of contextual information provided to the human agent for facilitating agent interaction with the caller, in accordance with an embodiment of the invention.

FIG. 5 is an example representation of contextual information 500 provided to a human agent for facilitating agent interaction with the caller 102 (shown in FIG. 1), in accordance with an embodiment of the invention. As explained with reference to an illustrative example in FIG. 1, the caller 102 may place a call to the customer support center 106 to seek assistance in filing an insurance claim and get connected to an IVR system (such as the IVR system 104 shown in FIG. 1). Further, the voice interaction between the caller 102 and the IVR system 104 is augmented with a self-serve web session, i.e. the speech synchronized web session. The caller 102 is provided with an option to speak to a human agent upon detecting that the caller 102 is facing an issue in completing the self-serve steps on the webpage UIs of the speech synchronized web session. The human agent is provided a context of the interaction i.e. a contextual journey of the IVR interaction and the web session interaction), conducted so far so as to enable the human agent to provide appropriate assistance to the caller 102. To provide the contextual journey, the apparatus 150 is configured to cause display of content associated with the contextual information 500 on a display screen of an agent's electronic device (not shown in FIG. 5).

As can be seen, the contextual information 500 provides an overview of the caller's journey on the IVR interaction channel and the multimodal (MM) web interaction channel. The contextual information 500 clearly highlights the reason for the caller 102 to have contacted the customer support center 106 and also the current issue (i.e. not able to add a car to the insured cars' list on the webpage UI associated with the web session).

As explained with reference to FIG. 4, subsequent to completion of the estimated waiting time for connecting with the human agent, the caller 102 may be connected to the human agent. The apparatus 150 is configured to automatically trigger co-browsing or screen-sharing of the web session, i.e. both the caller 102 and the human agent can view and browse the same screen(s). The screen may correspond to the screen being displayed on the caller's device or the screen being displayed on the agent's device. More specifically, the human agent is now provided with access to the screen being viewed by the caller 102 so that the human agent can identify the exact webpage UI that the caller 102 is currently navigating. It is noted that the session ID is persisted in such a co-browsing session and, as such, the activity (whether caller activity or the human agent activity) is tracked and recorded as part of the contextual information 500 corresponding to the caller's interaction for tiling of the insurance claim. It is noted that the caller 102 is informed of the sharing of the screen for the co-browsing/screen-sharing web session.

In one embodiment, the apparatus 150 is configured to implement a web socket connection between the web browsers in the caller's device and the agent's device, such that a webpage (also referred to herein as a Hypertext Markup language or HTML page) being displayed on the caller's device and all subsequent browsing activity being performed on the caller's device is mirrored on the agent's electronic device and vice versa.

In one embodiment, the webpage content viewed on the caller's device configures a source page, which is mirrored by the apparatus 150 and the mirrored content, referred to herein as mirror page, is displayed on the agent device. Further, each caller activity on the source page, such as input related to the form fields, navigation to the next page, up-scrolling and down-scrolling of content, selection of drop-down menus, etc. are also displayed in substantially real-time (i.e. with negligible delay) on the agent's device. Though the web session content is depicted to be mirrored from the caller's device onto the agent's device, in some example scenarios, the web activity being performed on the agent's device may be Mirrored onto the caller's device. Such a scenario may arise when the agent intends to show how to access a particular piece of information on the web session, or how to fill up a Web form, and the like. In some cases, the web activity may be mirrored on the caller's or the agent's device to share additional digital content as will be explained in further detail later.

It is noted that such co-browsing of the speech synchronized web session while the caller is also present in the voice interaction channel precludes disjointed communication between the enterprise and the customer in multiple interaction channels. Moreover, co-browsing the web session while simultaneously providing agent guidance on phone enables provisioning of a superior interaction experience to the customer as the agent can involve visual medium to direct the caller to the relevant information, which may not be possible if separate interaction channels were used. Furthermore, the personalized digital content may be shared with the caller during the co-browsing session to enhance the caller's interaction experience.

Figure 6:
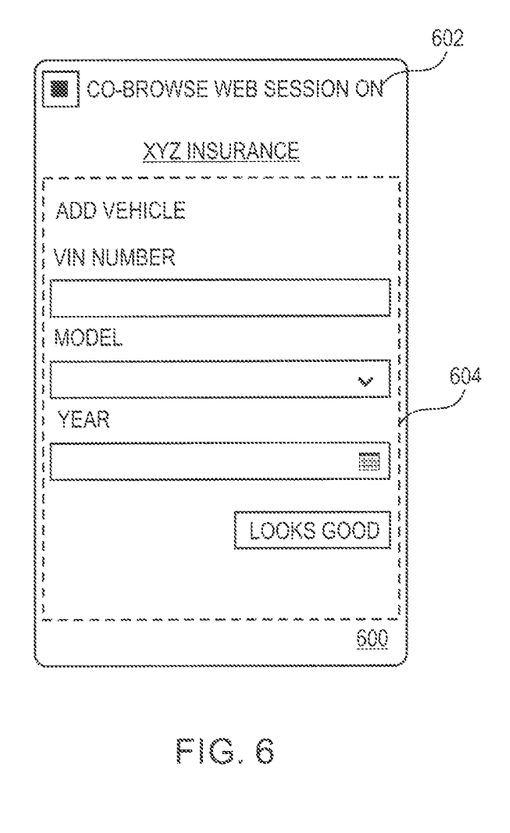
FIG. 6 shows a representation of an example UI associated with a co-browsing web session, in accordance with an embodiment of the invention.

An example UI associated with the co-browsing/screen-sharing web session is shown in FIG. 6.

FIG. 6 shows a representation of an example UI 600 associated with a co-browsing web session, in accordance with an embodiment of the invention. As explained with reference to FIG. 5, the apparatus 150 automatically triggers a co-browsing of the web session subsequent to the connection of the caller 102 to the human agent. As an illustrative example, the UI 600 shown in FIG. 6 corresponds to the UI displayed on the caller's device and shared with the human agent. As an example, a widget banner 602 displayed on the top of the UI 600 is indicative of the current screen being shared with the human agent.

In at least one embodiment, the human agent is configured to push content for display during the co-browsing web session. In some embodiments, content pieces relevant to the interaction may be identified by the apparatus 150 based on the contextual information. The apparatus 150 may provide such content pieces as 'recommended content' to the human agent. The human agent may select appropriate content pieces from among the recommended content and cause display of a content piece during the co-browsing web session. In at least one embodiment, the content to be displayed to the caller 102 may be configured as webpage and overlaid on top of the current screen being viewed by the caller 102. An example overlaid content is shown as content 604 on the UI 600. The content 604 corresponds to webpage in form fields requesting the caller 102 to enter information related to the car, which is missing in the insured cars' list. As the web session is speech synchronized, the caller 102 may utter the details related to the car and the corresponding form fields may be automatically populated as explained with reference to FIG. 3. The human agent may also populate some information on the caller's behalf and in general assist the caller in adding the car details to the insured cars' list. The human agent may then drop off and the caller 102 may continue the self-serve web session to file the insurance claim for the broken windshield of the car 108. Alternatively, the human agent may continue to assist the caller 102 till the end of the interaction (i.e. till the insurance claim is filed). Such assistance offered over multiple interaction channels and multiple devices (also referred to as multimodal interaction) greatly improves a customer's interaction experience and provides the desired assistance in a seamless and effortless manner. A method for providing multimodal interaction assistance to a caller is explained next with reference to FIG. 7.

Figure 7:
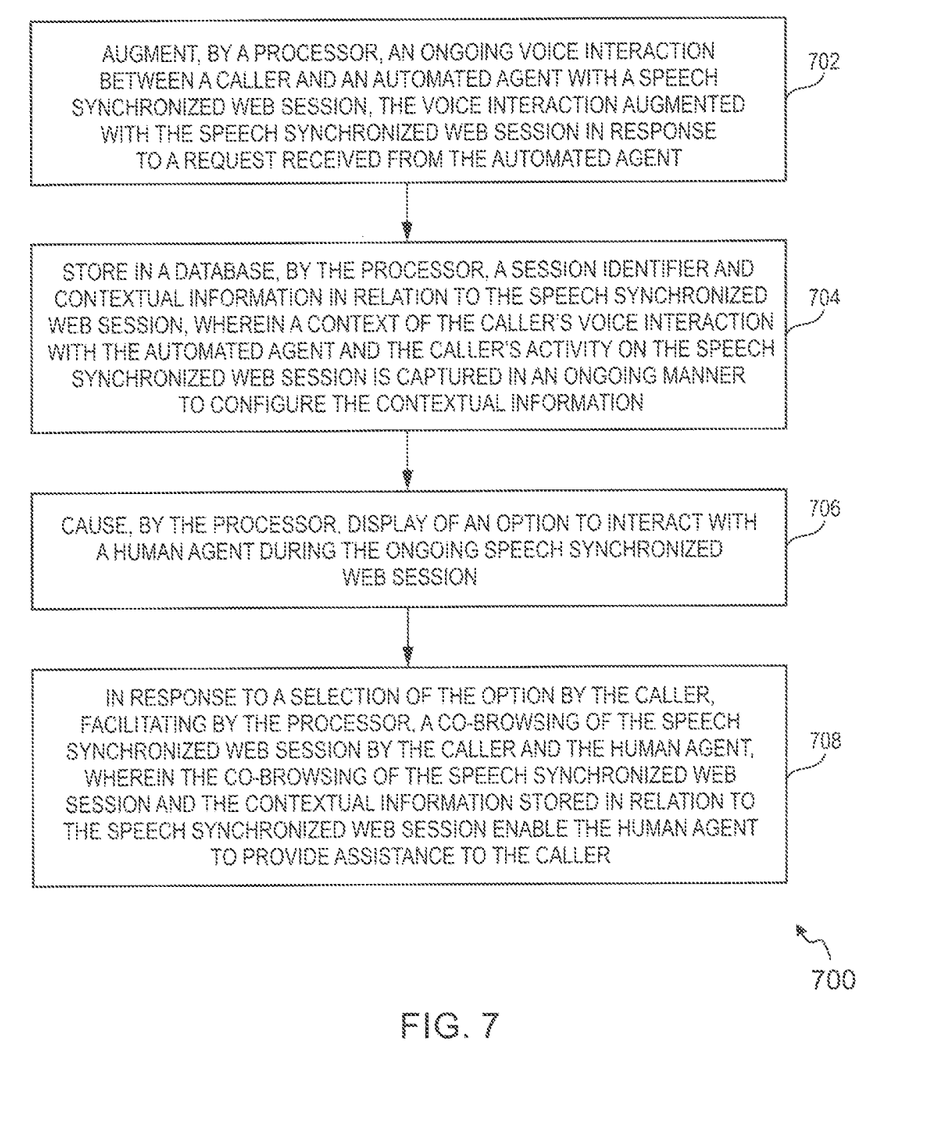
FIG. 7 shows a flow diagram of a method for providing multimodal interaction assistance to a caller, in accordance with an embodiment of the invention.

FIG. 7 shows a flow diagram of a method 700 for providing multimodal interaction assistance to a caller, in accordance with an embodiment of the invention. The method 700 depicted in the flow diagram may be executed by, for example, the apparatus 150 explained with reference to FIGS. 1 to 6. Operations of the flowchart, and combinations of operation in the flowchart, may be implemented by, for example, hardware, firmware, a processor, circuitry and/or a different device associated with the execution of software that includes one or more computer program instructions. The operations of the method 700 are described herein with help of the apparatus, such as the apparatus 150. It is noted that, the operations of the method 700 can be described and/or practiced by using any system other than the apparatus 150. The method 700 starts at operation 702.

At operation 702 of the method 700, an ongoing voice interaction between a caller and an automated agent is augmented with a speech synchronized web session by a processor, such as the processor 152 of the apparatus 150 explained with reference to FIGS. 1 to 6.

In one embodiment, the processor on account of being in operative communication with a customer support center, such as the customer support center 106 shown in FIG. 1, may receive a call from the caller wishing to speak with a customer support representative of the enterprise. The processor may be configured to connect the caller to an automated agent deployed at the customer support center. It is noted that the automated agent is trained to communicate with callers and provide the callers with desired assistance. In one embodiment, the automated agent may be embodied as an automated voice agent in the form of an Interactive Voice Response (IVR) system, such as the IVR system 104 shown in FIG. 1. The IVR system may further be trained to either assist the caller by itself, route the call to a human agent or direct the caller to a self-serve option. In one illustrative example, the logic associated with the IVR system may determine that the caller is better served using a self-serve option instead of the ongoing voice interaction. Accordingly, in one embodiment, the IVR system may provide a request to the processor to add a self-serve interaction channel to the ongoing voice interaction.

In one embodiment, in response to receiving the request from the IVR system, the processor may be configured to predict one or more devices accessible to the caller, where each device is connected to, or capable of, accessing a communication network, such as the network 120 shown in FIG. 1. It is noted that an electronic device used by the caller for conducting the ongoing voice interaction with the IVR system may also be accounted for in the prediction of the one or more devices accessible to the caller. In one embodiment, the processor may predict one or more devices accessible to the caller based on previous interaction that the caller had with the customer support center. In some embodiments, the IVR system may check with the caller on the devices that the caller can access at the moment and avoid prediction of devices accessible to the caller. If the caller can access any of the connected devices, such as a smart phone, iPad, laptop, PDA, or any other suitable device, then the IVR system may inform the caller that a simple and fast self-serve option in form of a speech synchronized Web session is available for filing of the insurance claim. The IVR system may further seek the permission of the customer to augment the call with the speech synchronized web session.

If the caller agrees to the request to augment the voice interaction with the speech synchronized web session, then the apparatus on account of tracking the interaction may be configured to receive the caller's confirmation to augment the voice interaction. In response, the processor is configured to transmit a message (for example, a Short Message Service (SMS) or an Email) including a Uniform Resource Locator (URL) to the caller on at least one device from among the devices identified to be accessible to the caller. An example text message embodied as a SMS provided to the caller is shown in FIG. 2. The caller may provide a click input or a touch input on an URL in the text message to trigger augmentation of the voice interaction (i.e. the voice call) with the speech synchronized web session.

The term 'speech synchronized web session' implies an interaction session between a caller and a series of webpage UIs, where each webpage UI includes one or more form fields requesting caller input and, where the caller navigates through the series of webpage UIs as well as provides the input for the respective form fields using speech or typed text. More specifically, the visual medium of the webpage UN is synced to the caller speech, such that the caller utterance is configured to be appropriately mapped to the content on the webpage UI. For example, if the caller utters 'NEXT', then the webpage UI may automatically navigate to the next webpage UI. In another illustrative example, if the caller in response to a form field requesting the date of the incident, utters 'YESTERDAY', then the form field may automatically be populated with yesterday's date. It is noted that the caller may also choose to type the date or click on 'NEXT' on the webpage UI. The speech synchronized web session is also interchangeably referred to as 'web session'. In one embodiment, the synchronization between the spoken utterances and the caller's activity on the webpages is achieved as explained with reference to FIGS. 1 an 2, using at least one Extensible Markup Language (XML) interpreter based on State Chart XML (SCXML) and Call Control XML (CCXML).

At operation 704 of the method 700, a session identifier and contextual information in relation to the speech synchronized web session is stored in a database, such as the database 170 shown in FIG. 1.

More specifically, in one embodiment, the caller activity on the web session may be tracked and recorded in a database. In some embodiments, the caller's interaction, right from the IVR interaction to the current web session may be tracked and recorded. Such recorded information captures a 'context' of the interaction conducted so far and is referred to as the 'contextual information'. In one embodiment, the contextual information is stored with a session Identifier (ID), which is configured to uniquely identify the caller's interaction with the IVR/web session. The tracking/recording of the contextual information and the subsequent storage of the contextual information with a session ID may be provided as a web service by the apparatus. The web service is also referred to as 'context service'. The context service may be called during multimodal interaction transfers.

In some embodiments, the caller, in spite of several attempts may face an issue while completing the steps associated with the speech synchronized web session and may need agent assistance. The apparatus, on account of tracking of the caller's activity during the ongoing web session may detect the caller's need for assistance. In response to the detection of the caller's need for assistance, at operation 706 of the method 700, a display of an option to interact with a human agent is caused by the processor during the ongoing speech synchronized web session, thereby providing an option to the caller to connect to a human agent and seek assistance from the human agent. An example option presented to the caller on the caller's device is shown in FIG. 4.

In response to the caller's selection of the option, at operation 708 of the method 700, a co-browsing of the speech synchronized web session by the caller and the human agent is facilitated by the processor. The co-browsing of the speech synchronized web session and the contextual information stored in relation to the speech synchronized web session enable the human agent to provide assistance to the caller.

In one embodiment, the apparatus may receive the caller selection of the option and identify a human agent from among a plurality of human agents capable of handling a voice interaction with the caller. In some scenarios, the identified human agent may be engaged in interaction with another caller and may be estimated to be free in some time. In such a situation, the apparatus may be configured to display an estimated waiting time to connect to a human agent to the caller and provide the caller with an option to either wait for the human agent to join or arrange for a call-back from the human agent after the stipulated waiting time is over. The caller may choose to wait for the stipulated waiting time or hang up and receive a call from the human agent once the stipulated waiting time is over.

In one embodiment, the human agent upon completion of the interaction with another caller may provide an indication to initiate the interaction with the caller. The apparatus is further configured to call the contextual service using an application programming interface (API) call and provide the contextual information along with the session ID to the human agent. The human agent may learn the entire history of the caller's interaction so far from the contextual information.

Further, subsequent to completion of the estimated waiting time for connecting with the human agent, the apparatus is configured to automatically trigger co-browsing or screen-sharing of the web session, i.e. both the caller and the human agent can view and browse the same screen(s). The screen may correspond to the screen being displayed on the caller's device or the screen being displayed on the agent's device. More specifically, the human agent is now provided with access to the screen being viewed by the caller so that the human agent can identify the exact webpage UI that the caller is currently navigating. It is noted that the session ID is persisted in such a co-browsing session and, as such, the activity (whether caller activity or the human agent activity) is tracked and recorded as part of the contextual information corresponding to the caller's interaction for filing of the insurance claim. It is noted that the caller is informed of the sharing of the screen for the co-browsing/screen-sharing web session.

In one embodiment, the apparatus is configured to implement a web socket connection between the web browsers in the caller's device and the agent's device, such that a webpage (also referred to herein as a Hypertext Markup language or HTML page) being displayed on the caller's device and all subsequent browsing activity being performed on the caller's device is mirrored on the agent's electronic device and vice versa.

In at least one embodiment, the human agent is configured to push content for display during the co-browsing web session. In some embodiments, content pieces relevant to the interaction may be identified by the apparatus based on the contextual information. The apparatus may provide such content pieces as 'recommended content' to the human agent. The human agent may select appropriate content pieces from among the recommended content and cause display of a content piece during the co-browsing web session. In at least one embodiment, the content to be displayed to the caller may be configured as webpage and overlaid on top of the current screen being viewed by the caller. An example overlaid content is shown as the content 604 on the UI 600 shown in FIG. 6. Such assistance offered over multiple interaction channels and multiple devices (also referred to as multimodal interaction) greatly improves a customer's interaction experience and provides the desired assistance in a seamless and effortless manner. The method 700 ends at operation 708.

It is noted that though the multimodal interaction assistance is provided to a calling customer in FIGS. 1 to 7, such multimodal interaction assistance may also be extended to customers who engage with the agents through the chat medium. A method for providing multimodal interaction assistance to a chat customer, is explained with reference to FIG. 8.

Figure 8:
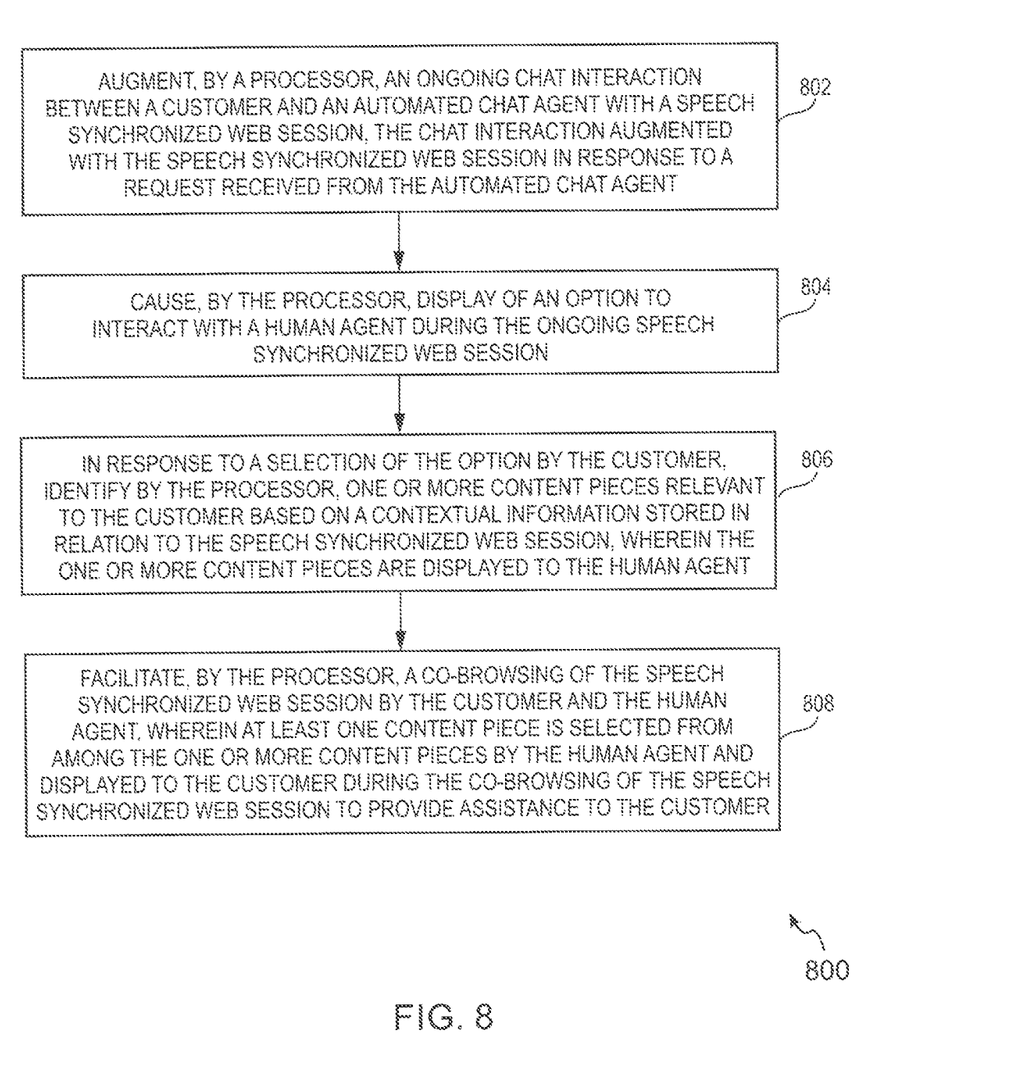
FIG. 8 shows a flow diagram of a method for providing multimodal interaction assistance to a chat customer seeking assistance from an agent of an enterprise, in accordance with an embodiment of the invention.

FIG. 8 shows a flow diagram of a method 800 for providing multimodal interaction assistance to a chat customer seeking assistance from an agent of an enterprise, in accordance with another embodiment of the invention. The various steps and/or operations of the flow diagram, and combinations of steps/operations in the flow diagram, may be implemented by, for example, hardware, firmware, a processor, circuitry and/or by an apparatus such as the apparatus 150 explained with reference to FIGS. 1 to 6 and/or by a different device associated with the execution of software that includes one or more computer program instructions. The method 800 starts at operation 802.

At operation 802 of the method 800, an ongoing chat interaction between a customer and an automated chat agent is augmented with a speech synchronized web session by a processor, such as the processor 152 of the apparatus 150 (shown in FIG. 1).

In an illustrative example, a customer wishing to seek agent assistance may request a chat interaction with an agent on a website by clicking on a chat assistance widget displayed on a website. The website may correspond to an enterprise website or a third-party website, such as an E-commerce website. The apparatus on account of being in operative communication with servers hosting the website may receive such a request for chat interaction and connect the customer to an automated chat agent (i.e., a chatbot). The automated chat agent, during the course of the chat interaction, may determine that the customer is better served using a self-serve interaction channel and accordingly seek customer's permission to augment the chat interaction with a speech synchronized web session. The speech synchronized web session may be augmented to the chat interaction using the same device or a different device. If the speech synchronized web session (hereinafter referred to as the web session) is triggered on the same device used by the customer for conducting the chat interaction, then a text message including the URL capable of triggering the web session may be provided in the chat window itself. The customer may select the URL, to cause display of webpage UIs associated with the web session. In some embodiments, the webpage UIs may slide out from the chat window and the customer may be able to view the form fields in the UI extension of the chat window.

If the customer faces any issue in completing the form fields, at operation 804 of the method 800, display of an option to interact with a human agent is caused by the processor during the ongoing speech synchronized web session. The display of the option to interact with the agent is explained with reference to FIG. 4 and is not explained again herein. The customer can either interact with the automated chat agent itself or select the option to connect to a human agent.

In response to the caller's selection of the option, at operation 806 of the method 800, one or more content pieces relevant to the caller are identified by the processor based on a contextual information stored in relation to the speech synchronized web session. The identification of the relevant content pieces is explained with reference to FIG. 6 and is not explained again herein. In one embodiment, one or more content pieces are displayed to the human agent.

At operation 808 of the method 800, a co-browsing of the speech synchronized web session by the caller and the human agent is facilitated by the processor. In one embodiment, at least one content piece is selected by the human agent and displayed to the caller during the co-browsing of the speech synchronized web session to provide the assistance to the caller. The co-browsing of the speech synchronized web session and the pushing of the content to the customer during the course of the speech synchronized web session to provide desired assistance to the customer is explained with reference to FIGS. 5 and 6 and is not explained again.

Various embodiments disclosed herein provide numerous advantages. The techniques disclosed herein suggest techniques for providing multi modal interaction assistance to customers, such as calling customers and chat customers of an enterprise, while precluding disjointed or to-and-fro communication on multiple interaction channels. To that effect, co-browsing of speech synchronized web session by a customer and agent is facilitated. Moreover, agent is enabled to push personalized digital content, such as web page UIs facilitating resolution of caller issues during the co-browsing session. As a result, of combining co-browsing with sharing of personalized digital content in a speech synchronized web session, a quality of interaction experience is improved manifold.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 150 and its various components such as the processor 152, the memory 154, the I/O module 156 and the communication module 158 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIGS. 7 and 8). A computer-readable medium storing, embodying, or encoded with a computer program, or similar language, may be embodied as a tangible data storage device storing one or more software programs that are configured to cause a processor or computer to perform one or more operations, Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for providing multimodal interaction assistance to callers seeking assistance from agents of an enterprise, the method comprising:
    augmenting, by a processor, an ongoing voice interaction between a caller and an automated agent with a speech synchronized web session, the voice interaction augmented with the speech synchronized web session in response to a request received from the automated agent;
    storing in a database, by the processor, a session identifier and contextual information in relation to the speech synchronized web session, wherein a context of the caller's voice interaction with the automated agent and the caller's activity on the speech synchronized web session is captured in an ongoing manner to configure the contextual information;
    causing, by the processor, display of an option to interact with a human agent during the ongoing speech synchronized web session; and
    in response to a selection of the option by the caller, facilitating by the processor, a co-browsing of the speech synchronized web session by the caller and the human agent, wherein the co-browsing of the speech synchronized web session and the contextual information stored in relation to the speech synchronized web session enable the human agent to provide assistance to the caller.

2. The method of claim 1, wherein the automated agent corresponds to an Interactive Voice Response (IVR) system and; wherein the request received from the automated agent corresponds to a request to add a self-serve interaction channel to the ongoing voice interaction.

3. The method of claim 1, further comprising:
    predicting, by the processor, one or more devices accessible to the caller in response to receiving the request from the automated agent, each device from among the one or more devices connected to, or capable of, accessing a communication network, wherein the one or more devices comprise an electronic device used by the caller for conducting the ongoing voice interaction with the automated agent; and
    transmitting, by the processor, a message including a Uniform Resource Locator (URL) to at least one device from among the one or more devices, wherein a selection of the URL by the caller on a device is configured trigger the speech synchronized web session on the device.

4. The method of claim 3, further comprising:
    causing, by the processor, display of one or more webpage User Interfaces (UIs) to the caller during the speech synchronized web session, wherein each webpage UI from among the one or more webpage UIs comprises at least one form field capable of receiving textual input transcribed from spoken utterances provided by the caller in response to the respective form field.

5. The method of claim 4, wherein synchronization between the spoken utterances and the caller's activity on the one or more webpage UIs is achieved using one or more Extensible Markup Language (XML) interpreters based on at least one of a State Chart XML (SCXML) and a Call Control XML (CCXML).

6. The method of claim 1, further comprising:
    identifying, by the processor, one or more content pieces relevant to the caller based on the contextual information stored in relation to the speech synchronized web session; and
    causing, by the processor, display of the one or more content pieces to the human agent, wherein at least one content piece is selected from among the one or more content pieces by the human agent and displayed to the caller during the co-browsing of the speech synchronized web session to provide the assistance to the caller.

7. The method of claim 1, further comprising:
    configuring a web socket connection between web browsers in a caller's device and a device associated with the human agent for facilitating the co-browsing of the speech synchronized web session, wherein a webpage UI being displayed on the caller's device and all subsequent browsing activity being performed on the caller's device is mirrored on the device associated with the human agent.

8. The method of claim 1, further comprising:
    receiving, by the processor, a call from the caller wishing to speak with a customer support representative of the enterprise; and
    connecting the caller to the automated agent by the processor, wherein the automated agent is trained to communicate with the callers and provide the callers with desired assistance.

9. The method of claim 1, wherein the voice interaction with the automated agent is discontinued after augmenting the voice interaction between the caller and the automated agent with the speech synchronized web session.

10. The method of claim 1, further comprising:
    causing, by the processor, display of an estimated waiting time for connecting the human agent to the caller, the estimated waiting time displayed in response to the caller's selection of the option to interact with the human agent, wherein the estimated waiting time is displayed along with a call-back option configured to arrange a call-back from the human agent after the estimated waiting time is over.

11. An apparatus for providing multimodal interaction assistance to callers seeking assistance from agents of an enterprise, the apparatus comprising:
    a memory for storing instructions; and
    a processor configured to execute the instructions and thereby cause the apparatus to at least perform:
        augment an ongoing voice interaction between a caller and an automated agent with a speech synchronized web session, the voice interaction augmented with the speech synchronized web session in response to a request received from the automated agent;
        store in a database, a session identifier and contextual information in relation to the speech synchronized web session, wherein a context of the caller's voice interaction with the automated agent and the caller's ongoing activity on the speech synchronized web session is captured in an ongoing manner to configure the contextual information;

cause display of an option to interact with a human agent during the ongoing speech synchronized web session; and in response to a selection of the option by the caller, facilitate a co-browsing of the speech synchronized web session by the caller and the human agent, wherein the co-browsing of the speech synchronized web session and the contextual information stored in relation to the speech synchronized web session enable the human agent to provide assistance to the caller.

12. The apparatus of claim 11, wherein the apparatus is further caused to perform:

predict one or more devices accessible to the caller in response to receiving the request from the automated agent, each device from among the one or more devices connected to, or capable of, accessing a communication network, wherein the one or more devices comprise an electronic device used by the caller for conducting the ongoing voice interaction with the automated agent; and transmit a message including a Uniform Resource Locator (URL) to at least one device from among the one or more devices, wherein the selection of the URL by the caller on a device is configured to trigger the speech synchronized web session on the device.

13. The apparatus of claim 12, wherein the apparatus is further caused to perform:

cause display of one or more webpage User Interfaces (UIs) to the caller during the speech synchronized web session, wherein each webpage UI from among the one or more webpage UIs comprises at least one form field capable of receiving textual input transcribed from spoken utterances provided by the caller in response to the respective form field and, wherein synchronization between the spoken utterances and the caller's activity on the one or more webpage UIs is achieved using one or more Extensible Markup Language (XML) interpreters based on at least one of a State Chart XML (SCXML) and a Call Control XML (CCXML).

14. The apparatus of claim 11, wherein the apparatus is further caused to perform:

identify one or more content pieces relevant to the caller based on the contextual information stored in relation to the speech synchronized web session; and cause display of the one or more content pieces to the human agent, wherein at least one content piece is selected from among the one or more content pieces by the human agent and displayed to the caller during the co-browsing of the speech synchronized web session to provide the assistance to the caller.

15. The apparatus of claim 11, wherein the apparatus is further caused to:

configure a web socket connection between web browsers in a caller's device and a device associated with the human agent for facilitating the co-browsing of the speech synchronized web session, wherein a webpage UI being displayed on the caller's device and all subsequent browsing activity being performed on the caller's device is Mirrored on the device associated with the human agent.

16. The apparatus of claim 11, wherein the apparatus is further caused to:

receive a call from the caller wishing to speak with a customer support representative of the enterprise; and connect the caller to the automated agent, wherein the automated agent is trained to communicate with callers and provide the callers with desired assistance.

17. The apparatus of claim 11, wherein the apparatus is further configured to:

cause display of an estimated waiting time for connecting the human agent to the caller, the estimated waiting time displayed in response to the caller's selection of the option to interact with the human agent, wherein the estimated waiting time is displayed along with a call-hack option configured to arrange a call-back from the human agent after the estimated waiting time is over.

18. A computer-implemented method for providing multimodal interaction assistance to chat customers seeking assistance from agents of an enterprise, the method comprising:

augmenting, by a processor, an ongoing chat interaction between a customer and an automated chat agent with a speech synchronized web session, the chat interaction augmented with the speech synchronized web session in response to a request received from the automated chat agent;

causing, by the processor, display of an option to interact with a human agent during the ongoing speech synchronized web session;

in response to a selection of the option by the customer, identify by the processor, one or more content pieces relevant to the customer based on a contextual information stored in relation to the speech synchronized web session, wherein the one or more content pieces are displayed to the human agent; and facilitating, by the processor, a co-browsing of the speech synchronized web session by the customer and the human agent, wherein at least one content piece is selected from among the one or more content pieces by the human agent and displayed to the customer during the co-browsing of the speech synchronized web session to provide assistance to the customer.

19. The method of claim 18, further comprising:

configuring a web socket connection between web browsers in a customer's device and a device associated with the human agent, wherein a webpage UI being displayed on the customer's device and all subsequent browsing activity being performed on the customer's device is mirrored on the device associated with the human agent.

20. The method of claim 18, further comprising:

causing, by the processor, display of one or more webpage user interfaces (UIs) to the customer during the speech synchronized web session, wherein each webpage UI from among the one or more webpage UIs comprises at least one form field capable of receiving textual input transcribed from spoken utterances provided by the customer in response to the respective form field and, wherein synchronization between the spoken utterances and the customer's activity on the one or more webpage UIs is achieved using one or more Extensible Markup Language (XML) interpreters based on at least one of a State Chart XML (SCXML) and a Call Control XML (CCXML).

* * * * *